United States Patent
Zheng et al.

(10) Patent No.: US 8,470,896 B2
(45) Date of Patent: Jun. 25, 2013

(54) ACID BLOCK ANION MEMBRANE

(75) Inventors: Yongchang Zheng, Watertown, MA (US); John Barber, Fergus (CA)

(73) Assignee: General Electric Company, Schenectady, NY (US)

( * ) Notice: Subject to any disclaimer, the term of this patent is extended or adjusted under 35 U.S.C. 154(b) by 230 days.

(21) Appl. No.: 12/977,923

(22) Filed: Dec. 23, 2010

(65) Prior Publication Data

US 2012/0165419 A1    Jun. 28, 2012

(51) Int. Cl.
*C08J 5/22*    (2006.01)
*B01J 41/14*    (2006.01)
*B01J 39/20*    (2006.01)

(52) U.S. Cl.
USPC .................................. 521/27; 521/32; 521/38

(58) Field of Classification Search
USPC ............................................... 521/27, 32, 38
See application file for complete search history.

(56) References Cited

U.S. PATENT DOCUMENTS

| | | | |
|---|---|---|---|
| 4,231,855 A | 11/1980 | Hodgdon | |
| 4,822,471 A | 4/1989 | MacDonald | |
| 5,045,171 A | 9/1991 | MacDonald | |
| 5,118,717 A * | 6/1992 | Hodgdon et al. | 521/38 |
| 5,397,445 A | 3/1995 | Umemura et al. | |

FOREIGN PATENT DOCUMENTS

JP        2009215500 A * 9/2009

OTHER PUBLICATIONS

Search Report and Written Opinion from corresponding PCT Application No. PCT/US2011/065312 dated May 9, 2012.
Ludivine Franck-Lacaze et al., "Determination of the pKa of poly (4-vinylpyridine)-based weak anion exchange membranes for the investigation of the side proton leakage", Journal of Membrane Science, 326 (2009) 650-658.
Yves Lorrain et al., "Influence of Cations on the Proton Leakage Through Anion-Exchange Membranes," Journal of Membrance Science 110 (1996) 181-190.

\* cited by examiner

*Primary Examiner* — Michael M Bernshteyn
(74) *Attorney, Agent, or Firm* — Wegman, Hessler & Vanderburg

(57) ABSTRACT

Acid block anionic selective polymeric membranes are provided of the type having a woven or non-woven cloth reinforcing structure. The polymer of the membrane is prepared by the process comprising copolymerizing components I, II, and III wherein I is an ethylenically unsaturated aliphatic or aromatic tertiary or quaternary amine monomer. II is a crosslinking monomer, and III is vinylbenzyl chloride. The reaction is conducted in the presence of a free radical polymerization initiator. Additionally, anionic exchange membranes of the type used in electrodialysis apparatus are disclosed and comprise a woven or nonwoven cloth that is impregnated with a copolymer comprising the reaction products of components I, II, and III.

17 Claims, No Drawings

ACID BLOCK ANION MEMBRANE

FIELD OF INVENTION

The invention pertains to an electrodialysis anion selective membrane and to methods for producing such membranes.

BACKGROUND OF THE INVENTION

Bipolar electrodialysis (BPED) is a membrane separation process in which high purity acid and base solutions may be generated from a salt solution by the electrodialysis water splitting process. Typically, apparatus designed to perform such ED function consists of a stack containing a plurality of cation-selective membranes, bipolar membranes, and anion selective membranes positioned between a pair of electrodes. The stack may itself comprise an assembly of unit cells in which each unit cell comprises the above membranes arranged in such fashion to provide a plurality of flow paths or channels between adjacent membranes.

When a direct electrical current is applied to the bipolar membrane, water is split into $OH^-$ ions and $H^+$ ions which migrate to the anode and cathode respectively. The cation selective membrane readily allows passage of the cations (positively charged ions, such as $Na^+$, $H^+$) therethrough while blocking passage of anions. Conversely, the anion selective membranes readily permit passage of the anions (negatively charged ions, such as $Cl^-$, $OH^-$) while retarding cation migration. If a salt solution such as NaCl is directed through the channel between the cationic selective and anionic selective membranes, the concentration of that salt solution is depleted with HCl and NaOH being formed in adjacent acid and base containing channels.

In connection with some prior art ED devices, $H^+$ migration across the anion select membrane has proven problematic. This proton leak through the anion selective membrane is well known and is referred to as the Grotthuss mechanism by which protons diffuse through the hydrogen bonding network of water molecules. Anion selective membranes demonstrating substantial passage or migration of $H^+$ are detrimental to electrodialysis processes, resulting in poor anion transfer current efficiency, low concentration of acid and base and high equipment and energy costs.

SUMMARY OF THE INVENTION

In one exemplary embodiment, a method is provided for preparing an acid block anion selective polymeric membrane of the type having a woven or non-woven cloth reinforcing structure. The polymer of the membrane is prepared by the process comprising copolymerization of components of (I) an ethylenically unsaturated aliphatic or aromatic tertiary or quaternary amine monomer, (II) a cross-linking monomer, and (III) vinylbenzyl chloride in the presence of a free radical polymerization initiator. In one exemplary embodiment, the molar ratio of components (I):(II):(III) is from about 20-60:30-70:1-19. In another exemplary embodiment, the molar ratio of components I:II:III is from about 35-45:45-55:10-15. The foregoing percentages equal 100 molar %.

In another aspect of the invention, the copolymerization is conducted in the absence of nonpolymerizable solvent.

In another exemplary embodiment, the membrane is characterized as having a water content percent of from about 12-20 wt % and a current efficiency of greater than about 93%.

In another aspect of the invention, an anionic exchange membrane is provided of the type that is used in electrodialysis apparatus. The membrane comprises a woven or non-woven cloth with the cloth being impregnated with a copolymer comprising the reaction products of components I, II, and III wherein I is an ethylenically unsaturated aliphatic or aromatic tertiary or quaternary amine monomer, II is a cross-linking monomer, and III is a vinylbenzyl chloride.

DETAILED DESCRIPTION

In one aspect of the invention, the acid block anion selective membrane is prepared by copolymerizing (I) an ethylenically unsaturated aliphatic or aromatic tertiary or quaternary amine monomer and a (II) cross-linking monomer in the presence of (III) vinylbenzyl chloride (VBC). A free radical polymerization initiator (IV) is also present. Preferably no solvent is used. As used herein, "acid block" means an anion selective membrane that has enhanced capacity to retard the migration of $H^+$ therethrough. Typically, this is accomplished by reducing the water content of the membrane and/or increasing the cross linking of the polymer.

The components I, II, III, and initiator IV are mixed to form a homogenous solution. The resulting solution is used to impregnate a piece of cloth such as a polypropylene, polyester, acrylic, or modacrylic type cloth. The thus impregnated cloth is placed between glass plates, and this glass sandwich construction is then heated to initiate the polymerization. After completion of the polymerization reaction, the glass sheets are removed, leaving the polymer impregnated cloth.

The polymer impregnated cloth is then allowed to swell by soaking in an aqueous acidic bath such as a 2N HCl solution. The polymer impregnated cloth or sheet may then be used as an acid block anion selective membrane in electrodialysis and other applications.

As to the component I, exemplary aliphatic tertiary amines may be encompassed by the Formula A.

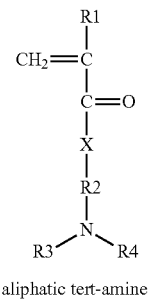

Formula A aliphatic tert-amine wherein R1 is H or $CH_3$, X is O or NH, R2 is lower ($C_1$-$C_6$) alkylene and R3 and R4 are independently chosen from lower ($C_1$-$C_6$)alkyl.

Exemplary component I aliphatic quaternary amine monomers may be encompassed by the Formula B.

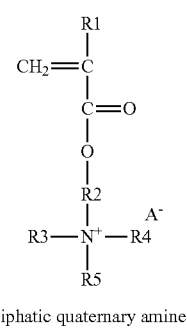

aliphatic quaternary amine wherein R1, R2, R3, and R4 are as defined in Formula A; R5 is chosen from lower ($C_1$-$C_6$)alkyl; and A is an anion chosen from halo, nitrite, sulfate and other inorganic or organic anions.

Exemplary component I aromatic tertiary amine monomers may be encompassed by the Formula C.

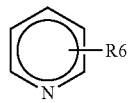

aromatic tertiary amine wherein R6 is vinyl.

Exemplary component I aromatic quaternary ammonium monomers may be encompassed by the Formula D.

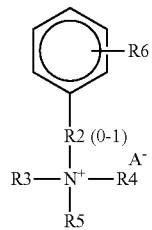

wherein R6 is the same as in Formula C, R2, when present, is the same as in Formula A; R3, R4, and R5 are the same as in Formula B and A⁻ is the same as defined in Formula B.

Specific members of (I) the ethylenically unsaturated aliphatic or aromatic tertiary or quaternary amine monomers that may be mentioned include i) trimethylaminoethylmethacrylate chloride (TMAEMC)

R1=$CH_3$, R2=Et, R3, R4, and R5 are $CH_3$ and A=Cl⁻;   Formula B ii) vinylbenzyltrimethylammonium chloride (VBTMAC)

R2=-$CH_2$—, R3, R4, and R5=$CH_3$, R6=vinyl, A=Cl⁻;   Formula D iii) vinyl pyridine R6=vinyl;   Formula C iv) dimethylaminoethylmethacrylate (DMAEMA)

R1=$CH_3$, X=O, R2=Et, R3 and R4=$CH_3$;   Formula A v) dimethylaminopropylmethacrylamide (DMAPMA)

R1=$CH_3$, X=NH, R2=propyl, R3 and R4=$CH_3$.   Formula A

The cross linking monomers II may generally be described as containing ethylenically unsaturated functionality and may be chosen from a wide class of known cross linking agents such as divinylbenzene (DVB), ethylene glycol dimethacrylate (EGDM), ethylene glycol diacrylate, 1,10-decane diol diacrylate or dimethacrylate, methylene bis acrylamide or bis methacrylamide, dodecamethylene bis acrylamide or bis methacrylamide, diethylene glycol diacrylate or dimethacrylate, 1,4 butane diol divinyl ether, triethylene glycol divinyl ether, divinyl succinate, subernate or sebacate, etc.

As to the polymerization initiators that may be used, these include the azo initiators such as 2,2-azo bis(2-methylpropionitrile) 2,2'-Azobis(2-methyl-propionamidine)dihydrochloride; 1,1'-Azobis(cyclohexane carbonitrile); 4,4'-Azobis (4-cyanovaleric acid)purum etc., peroxide initiators such as benzoyl peroxide, and t-butylperoxy-2-ethylhexanoate, 1,1-Bis(tert-amylperoxy)cyclohexane; 1,1-Bis(tert-butylperoxy)-3,3,5-trimethylcyclohexane; 1,1-Bis(tert-butylperoxy) cyclohexane; 2,4-Pentanedione peroxide; 2,5-Bis(tert butylperoxy)-2,5-dimethylhexane; 2-Butanone peroxide; di-tert-amyl peroxide; Di cumyl peroxide; Lauroyl peroxide, tert-Butylperoxy-2-ethylhexyl carbonate, tert-Butyl per acetate, tert-Butyl peroxide, and tert-Butyl peroxybenzoate, etc.

In one embodiment, ranges of addition for the components (I), (II), and (III) are as follows: Component I:II:III—(37-40%):(48-50%):12-13% . . . molar ratio.

EXAMPLES

Example 1 (A-1)

ABA-091509—vinylpyridine/DVB/VBC/PP 470

To a mixture of 12 grams (0.108 moles) of 4-vinyl pyridine, 6 grams (0.039 moles) of vinyl benzyl chloride (VBC) and 24 grams (0.147 moles) of 80% divinyl benzene (DVB), 0.8 grams (1.9% by weight) of t-butyl peroxy-2-ethyhexanoate is added. The resulting solution is a clear solution without the addition of any non-polymerizable solvents. The solution is poured into a Mylar tray sized 6.5"×6.5" with a piece of glass under the Mylar tray, a piece of polyester cloth is laid into the solution then a piece of Mylar sheet on the cloth. Alternate cloth and Mylar sheet to form a package of 3 layers and a piece of glass on the top of the assembly. The package is then moved to an oven with temperature at 90° C. for 2 hours. The package is taken apart to get 3 pieces of reinforced membrane sheets. The membrane sheets are then placed into a 2 N hydrochloric acid solution and allowed to swell until equilibrium. The final membrane is an acid efficiency anion membrane that can be used in bipolar electrodialysis for recovering mineral acid from salt.

Example 2 (A-2)

ABA-092409—DMAEMA/DVB/VBC/PP 447

To a mixture of 10 grams (0.0604 moles) of dimethylamino ethyl methacrylate (DMAEMA), 3 grams (0.0189 moles) of vinyl benzyl chloride (VBC) and 12 grams (0.0735 mole) of divinylbenzene (DVB), 0.5 grams (2.0% by weight) of t-butylperoxy-2-ethylhexanoate is added. The resulting solution is a clear solution without the addition of any non-polymerizable solvents. The solution is poured into a Mylar tray sized 6.5"×6.5" with a piece of glass under the Mylar tray, a piece of polypropylene (#477) cloth is laid into the solution. Then, a piece of Mylar sheet is placed over the cloth. Another cloth and Mylar sheet are placed in the solution. The cloth and Mylar sheet are alternately spaced to form a package of 3 layers, and a piece of glass is placed on top of the assembly. The package is then moved to an oven and maintained at a temperature of 90° C. for 2 hours. The package is taken apart to get 3 pieces of reinforced membrane sheets. The membrane sheets are then placed into a 2N HCl solution and allowed to swell until equilibrium. The final membrane is an acid efficiency anion membrane that can be used in bipolar electrodialysis for recovering mineral acid from salt.

Example 3 (A-3)

ABA-100609—DMAEMA/DVB/VBC/PE

To a mixture of 60 grams (0.363 moles) of dimethylamino ethyl methacrylate (DMAEMA), 18 grams (0.114 moles) of vinyl benzyl chloride (VBC) and 72 grams (0.442 moles) of 80% divinyl benzene (DVB), 3 grams (2% by weight) of t-butyl peroxy-2-ethyhexanoate is added. The resulting solution is a clear solution without the addition of any non-polymerizable solvents. The solution is poured into a Mylar tray sized 10"×11" with a piece of glass under the Mylar tray; a piece of polyester cloth is laid into the solution then a piece of Mylar sheet on the cloth. Alternate cloth and Mylar sheet to form a package of 3 layers and a piece of glass on the top of the assembly. The package is then moved to an oven with temperature at 90° C. for 2 hours. The package is taken apart to get 3 pieces of reinforced membrane sheets. The membrane sheets are then placed into a 2 N hydrochloric acid solution and allowed to swell until equilibrium. The final membrane is an acid efficiency anion membrane that can be used in bipolar electrodialysis for recovering mineral acid from salt.

Example 4

Membrane cell testing with the above membranes and several other commercially available membranes was conducted. Membrane current efficiency was measured by the method set forth in Example 2 of U.S. Pat. No. 4,822,471. The percent of current efficiency means that the given percent amount of current is used to transport anion through the anion membrane. The remaining percent of current represents the hydrogen leak through the anion membrane. The notation "strong" base means quaternary amine functionality with "weak" base denoting tertiary amine functionality. The quat amine in a membrane is measured by first converting the membrane into $Cl^-$ (chloride) form by soaking the membrane in 2N NaCl solution and washing out the free $Cl^-$ ion. Then another salt such as sodium nitrate solution is used to exchange the $Cl^-$ ion out from the membrane and titrate the $Cl^-$. It is thus possible to calculate the capacity of quat amine in the membrane in meq/per dry gram resin. To determine the tertiary amine in the membrane, the total amines including quat and tert amines is determined. Then the amount of quat amine is subtracted from the total amine amount present. In order to determine the total amines including quat and tert amines present in the membrane, first tert amines are converted to salt by adding HCl. (This also converts the quat amines to $Cl^-$ form). Then, a 100% ethanol solution is used to wash out excess HCl. Then sodium nitrate solution is used to exchange out the $Cl^-$ ions and titrate $Cl^-$ ions. The total amount of amines can then be calculated. The following results were obtained and are shown in Table I.

TABLE I

| Membrane ID | Composition | Cap (strong base) meq/g | Cap (weak base) meq/g | Water % | R ohm-$cm^2$ | Thickness cm | Current Effect % |
|---|---|---|---|---|---|---|---|
| C-1 | Commercial Aliphatic Anion Membrane | 2.5 | 0 | 45 | 8 | 0.055 | ~50 |
| C-2 | Commercial Aromatic Anion Membrane | 2.2 | 0 | 35 | 12 | 0.060 | ~65 |
| A-1 | vinylpyridine/DVB/VBC/PP | 0.9 | 1.27 | 13.8 | 49 | 0.030 | 93 & up |
| A-2 | DMAEMA/DVB/VBC/PP | 0.53 | 1.52 | 17 | 98 | 0.062 | 93 & up |
| A-3 | DMAEMA/DVB/VBC/PE | 0.77 | 1.69 | 13.9 | 68 | 0.028 | 94 & up |
| C-3* | See below | 0 | 0.92 | 12.4 | N/A | 0.0165 | N/A |
| C-4** | See below | 0 | 1.17 | 9.1 | N/A | 0.0125 | N/A |
| C-5 | See below | N/A | N/A | N/A | 40 | 0.012 | 92 & up |

C-3 - poly(vinyl pyridine) radio graft in fluoro-copolymers; available Solvay-Solvay ARA

*Data from *Journal of Membrane Science*, 326 (2009) 650-658.

C-4 - poly(vinyl pyridine) radio graft in fluoro-copolymers; available Solvay-Solvay AW

**Data from *Journal of Membrane Science*, 110 (1996) 181-190.

C-5 - vinylpyridine/DVD/polyvinyl chloride membrane; available Asahi Glass.

Example 5

(092509-470) To a mixture of 46 grams (0.257 moles) of dimethylamino propyl methacrylamide (DMAPMA), 12.8 grams (0.084 moles) of vinyl benzyl chloride (VBC) and 48 grams (0.295 moles) of 80% divinyl benzene (DVB), 2.1 grams (2% by weight) of t-butyl peroxy-2-ethylhexanoate is added. The resulting solution is a clear solution without the addition of any non-polymerizable solvents. The solution is poured into a Mylar tray sized 10"×11" with a piece of glass under the Mylar tray, a piece of polypropylene cloth is laid into the solution then a piece of Mylar sheet on the cloth. Alternate cloth and Mylar sheet to form a package of 3 layers and a piece of glass on the top of the assembly. The package is then moved to an oven with temperature at 90° C. for 2 hours. The package is taken apart to get 3 pieces of reinforced membrane sheets. The membrane sheets are then placed into a 2 N hydrochloric acid solution and allowed to swell until equilibrium. The final membrane is an acid efficiency anion membrane that can be used in bipolar electrodialysis for recovering mineral acid from salt.

Comparison Example (C-6) (ABA-#082809 VP/DVB/PP 470)

To a mixture of 15 grams (0.136 moles) of 4-vinyl pyridine and 30 grams (0.184 moles) of 80% divinyl benzene (DVB), 0.8 grams (1.9% by weight) of t-butyl peroxy-2-ethylhexanoate is added. No vinyl benzyl chloride (VBC) was added to the solution. The resulting solution is a clear solution without the addition of any non-polymerizable solvents. The solution is poured into a Mylar tray sized 6.5"×6.5", a piece of polypropylene cloth is laid into the solution then a piece of Mylar sheet on the cloth. Alternate cloth and Mylar sheet to form a package of 3 layers and a piece of glass on the top of the assembly. The package is then moved to an oven with temperature at 90° C. for 2 hours. The package is taken apart to get 3 pieces of reinforced membrane sheets. The membrane sheets are then placed into a 2 N hydrochloric acid solution and allowed to swell until equilibrium is reach. The final membrane is an acid efficiency anion membrane. The properties of the membranes are listed in the Table II below:

TABLE II

| Sample ID | Cap, st base Meq/g | Cap weak base Meq/g | Water % | Resistant* ohm-cm$^2$ | Thickness cm | % C.E. |
|---|---|---|---|---|---|---|
| A-1 | 0.95 | 1.67 | 12.8-14.0 | 49 | 0.036 | 93-97 |
| C-6 | 0.0 | 2.85 | 15.9-18.3 | 98 | 0.036 | 86-93 |

*Resistance is measured in 0.01N NaCl solution at 1000 Hz.

The membrane A-1 contains quaternary amine (strong base) tertiary amine (weak base) and higher crosslink degree due to the reaction of VBC with tertiary amine (vinyl pyridine), resulting in the membrane with lower water content, higher current efficiency but low resistant. The comparison membrane (C-6) contains only tertiary amine (weak base), resulting in low water content and high current efficiency, but much higher resistant of the membrane.

Example 6

Procedure Similar to U.S. Pat. No. 4,822,471—Example 2

A three compartment electrodialysis test cell was used to determine the current efficiency (C.E.) of the membrane of present invention as a comparison with those prior art when used in an acid solution. The cell comprised a cathode and anode electrode of platinum coated titanium located at the terminal ends of the cell with two membranes located there between and position from each other and from electrodes with gasketed spacers to form liquid containing compartments. Thus the arrangement was as follows: the anion exchange membrane to be tested, the middle compartment, a commercially available type cation exchange membrane (GE CR61CMP), the anode compartment and finally the anode electrode.

The membranes mounted in the test cell had an active membrane of 25 cm$^2$ and each compartment had a liquid volume of about 40 ml each and a cross-sectional active area of 25 cm$^2$. The solution in the cell comprised 1 N HCl in the cathode compartment, 0.5 N HCl in the center compartment and 0.5N H$_2$SO$_4$ in the anode compartment. The solutions were stirred by use of a magnetic stirrer and maintained at a temperature of 25° C. Each test run operated at 20 mA/cm$^2$ for a 20-minute period at which time the acid concentrations in the cell were determined by titration. The results are shown in Table III as follows:

TABLE III

| Anion membrane | % C.E. |
|---|---|
| C-1 | Aliphatic quaternary ammonium type | ~50% |
| C-2 | Aromatic quaternary ammonium type | ~65% |
| C-7 | Aliphatic acid efficient membrane with non-quaternized tertiary amine type as per U.S. Pat. No. 4,822,471 (Example 2) | 80.2% |
| C-8 | Aromatic acid efficient membrane with non-quaternized tertiary amine type | 86-93% |
| A-1 A-2 A-3 | Acid efficient membrane of the present invention with non-quaternized tertiary amine and quaternary amine type with high crosslink degree | 93% and up |

It is apparent that by adding VBC to the mixes of vinyl pyridine/DVB or DMAEMA/DVB or DMAPMA/DVB, the mixes were homogenous. Thus, no solvent was needed for the polymerization. Upon polymerization, the VBC also reacts with a portion of the tertiary amine, resulting in a membrane with both quaternary and tertiary amines with an attendant high cross linking degree. The A-3 membranes tested as shown in Table III exhibited a very high 93% and higher acid current efficacy.

By adding the VBC to react with a portion of the tertiary amine in the monomers such as vinyl pyridine, DMAEMA, DMAPMA, etc., we can control the ratio of quaternary and tertiary amines in the resulting membrane and can also increase membrane cross linking. A high current efficiency can be obtained from aliphatic monomers such as DMAEMA, DMAPMA, etc., due to the resulting high crosslink degree and low water content of the membranes. Resistance is also decreased due to the introduction of quaternary amines in the membrane.

In one preferred aspect of the invention, the anion block anion selective membrane is a polymerization reaction product of I) DMAEMC, II (DVB), and III (VBC). The molar ratio of I:II:III may be on the order of 20-60:30-70:1-19: and more preferably from 37-45:45-55:10-15. The preferred initiator is t-butyl peroxy-2-ethylhexanoate. More specifically, this reaction is shown by the following reaction scheme shown in Formula E with the resulting polymer shown in Formula F.

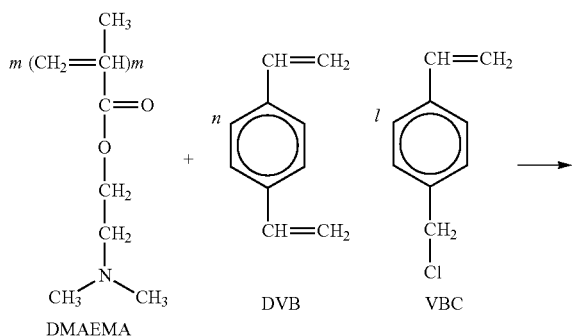

Formula E - reaction scheme

-continued

Formula F - resulting polymer

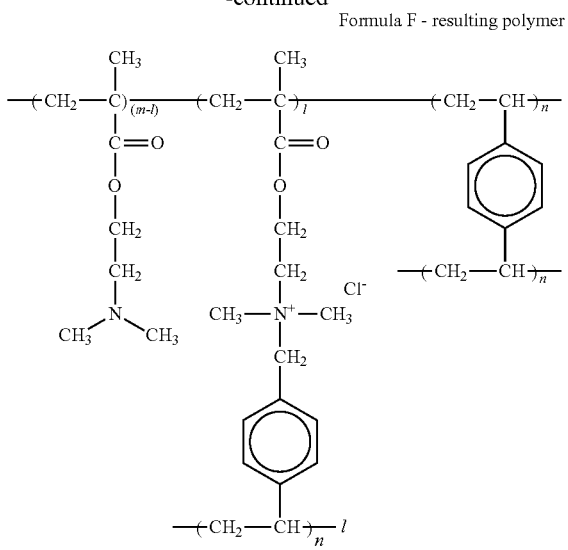

The acid block anion membranes of the invention are further characterized as having a water content of about 12-20%, preferably about 13-18%. Further, they exhibit a current efficiency of about 93% and greater and have a quaternary amine functionality of about 20-70% based on total amine present with an even more specific range of about 30-40% demonstrated by the specific examples herein shown.

It will be understood that the embodiments described herein are merely exemplary and that a person skilled in the art may make many variations and modifications without departing from the spirit and scope of the invention as defined in the appended claims.

The invention claimed is:

1. Method for preparing an acid block anion selective polymeric membrane having a woven or non-woven cloth reinforcing structure, the polymer of said membrane prepared by the process comprising copolymerizing components (I) an ethylenically unsaturated aliphatic or aromatic tertiary amine monomer, (II) a cross linking monomer, and (III) vinylbenzyl chloride, in the presence of a free radical polymerization initiator, said polymer having a tertiary amine:quaternary amine ratio in meq./per dry gram resin in the range of 1.41-2.86:1, and said membrane having a current efficiency of 93% and greater.

2. Method as recited in claim 1 wherein the molar ratio of components I:II:III is in the ranges of 20-60:30-70:1-19 with said I, II and III equating 100 molar percent.

3. Method as recited in claim 1 said copolymerization is conducted in the absence of non-polymerizable solvent.

4. Method as recited in claim 1 wherein said component (I) consists essentially of an ethylenically unsaturated aliphatic tertiary amine.

5. Method as recited in claim 1 wherein said component (I) consists essentially of an ethylenically unsaturated aromatic tertiary amine.

6. Method as recited in claim 4 wherein said component I comprises a member selected from the group consisting of DMAEMA and DMAPMA.

7. Method as recited in claim 5 wherein said component I is vinyl pyridine.

8. Method as recited in claim 6 wherein said cross linking monomer comprises a member selected from the group consisting of DVB and EGDM.

9. Method as recited in claim 8 wherein said cloth comprises a member selected from the group consisting of polypropylene woven cloth, polyester woven cloth and polyacrylic woven cloth, said membrane having a water content % of from about 12-20 wt % and a resistance R of about 50-100 ohm-cm$^2$ measured in 0.01N NaCl solution at 1,000 Hz.

10. Method as recited in claim 8 wherein said cloth comprises a member selected from the group consisting of polypropylene woven cloth, polyester woven cloth, polyester woven cloth, and polyacrylic woven cloth, and modacrylic woven cloth.

11. An anionic exchange membrane used in an electrodialysis apparatus, comprising a woven or non-woven cloth, said cloth impregnated with a copolymer comprising the reaction product of components (I), (II), and (III) wherein (I) is an ethylenically unsaturated aliphatic or aromatic tertiary amine monomer, (II) a cross linking monomer, and (III) vinyl benzyl chloride, said copolymer having a tertiary amine:quaternary amine ratio in meq./per dry gram resin in the range of 1.41-2.86:1, and said membrane having a current efficiency of 93% and greater.

12. Anionic exchange membrane as recited in claim 11 wherein said component (I) is a member selected from the group consisting of Formula A and C

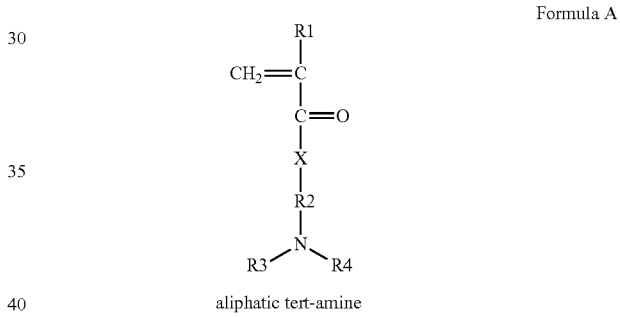

aliphatic tert-amine wherein R1 is H or CH$_3$, X is O or NH, R2 is lower alkyl (C$_1$-C$_6$) alkylene and R3 and R4 are independently chosen from lower (C$_1$-C$_6$) alkyl

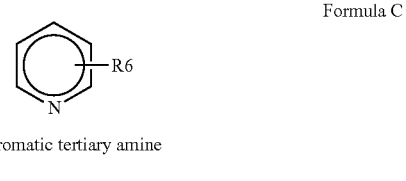

aromatic tertiary amine wherein R6 is vinyl.

13. Anionic exchange membrane as recited in claim 12 wherein the molar ratio of components I:II:III is in the ranges of 20-60:30-70:1-19% with the foregoing percentages adding up to 100%.

14. Anionic exchange membrane as recited in claim 13 wherein said component (I) comprises a member selected from the group consisting of DMAEMA and DMAPMA.

15. Anionic exchange membrane as recited in claim 14 wherein cross linking monomer component (II) is a member selected from the group consisting of DVB and EGDM.

16. Anionic exchange membrane comprising a polymer reinforced fabric, said polymer having the structure:
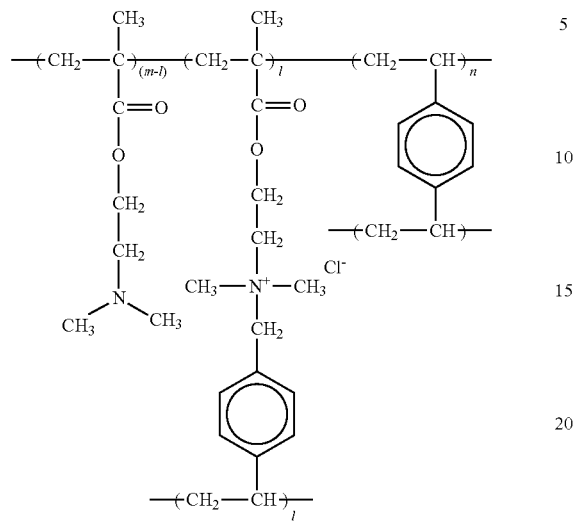
wherein the ratio of (m−1):1 in meq./per dry gram resin is in the range of 1.41-2.86:1.
17. Anion exchange membrane as recited in claim 16 wherein said membrane has a current efficiency of 93% and greater.
* * * * *

UNITED STATES PATENT AND TRADEMARK OFFICE
CERTIFICATE OF CORRECTION

PATENT NO. : 8,470,896 B2
APPLICATION NO. : 12/977923
DATED : June 25, 2013
INVENTOR(S) : Zheng et al.

It is certified that error appears in the above-identified patent and that said Letters Patent is hereby corrected as shown below:

On the Title page, Item (56), under "OTHER PUBLICATIONS", in Column 2, Line 8, delete "Membrance" and insert -- Membrane --, therefor.

In the Claims

In Column 10, Lines 10-11, in Claim 10,
delete "polyester woven cloth, polyester woven cloth," and
insert -- polyester woven cloth, --, therefor.

In Column 11, Lines 19-24, in Claim 16, delete " 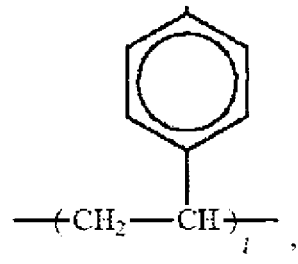 " and insert -- 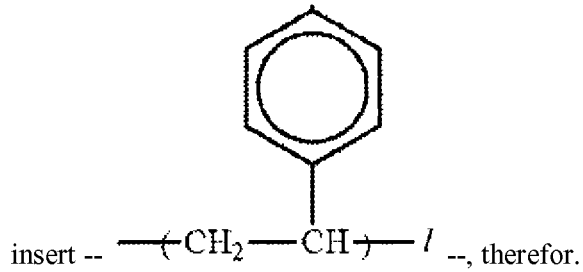 --, therefor.

Signed and Sealed this
First Day of October, 2013

Teresa Stanek Rea
*Deputy Director of the United States Patent and Trademark Office*